US010507731B2

(12) United States Patent
Tsukada et al.

(10) Patent No.: US 10,507,731 B2
(45) Date of Patent: Dec. 17, 2019

(54) ELECTRIC POWER SYSTEM

(71) Applicant: HONDA MOTOR CO., LTD., Tokyo (JP)

(72) Inventors: Yoshinari Tsukada, Wako (JP); Hiromichi Imai, Wako (JP); Shingo Soma, Wako (JP); Hisaya Oiwa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 15/552,895

(22) PCT Filed: Feb. 24, 2016

(86) PCT No.: PCT/JP2016/055453
§ 371 (c)(1),
(2) Date: Aug. 23, 2017

(87) PCT Pub. No.: WO2016/136815
PCT Pub. Date: Sep. 1, 2016

(65) Prior Publication Data
US 2018/0236874 A1  Aug. 23, 2018

(30) Foreign Application Priority Data

Feb. 25, 2015 (JP) .................. 2015-034797

(51) Int. Cl.
*B60L 3/04* (2006.01)
*B60L 3/00* (2019.01)
(Continued)

(52) U.S. Cl.
CPC ............. *B60L 3/04* (2013.01); *B60L 3/0007* (2013.01); *B60L 3/0061* (2013.01); *H02M 7/53871* (2013.01); *H02P 27/08* (2013.01)

(58) Field of Classification Search
CPC .. B60L 3/04; B60L 9/18; B60L 3/0061; H02P 3/22; Y02T 10/7241; H02M 2001/322; H02M 7/53871
(Continued)

(56) References Cited

U.S. PATENT DOCUMENTS

2007/0216327 A1    9/2007  Sugita
2010/0079093 A1*   4/2010  Kitanaka ................. B60L 3/003
                                                        318/400.3
(Continued)

FOREIGN PATENT DOCUMENTS

JP          9-46201 A    2/1997
JP         10-66386 A    3/1998
(Continued)

OTHER PUBLICATIONS

International Search Report dated May 31, 2016, issued in counterpart International Application PCT/JP2016/055453 (2 pages).

*Primary Examiner* — Jorge L Carrasquillo
*Assistant Examiner* — Devon A Joseph
(74) *Attorney, Agent, or Firm* — Westerman, Hattori, Daniels & Adrian, LLP

(57) ABSTRACT

Provided is an electric power system capable of rapidly slowing an electric motor and quickly discharging a capacitor when an abnormality occurs. If an abnormality detection device detects an abnormality, a control device of an electric power system performs a switching control that alternately switches between an upper arm three-phase short-circuit control that sets all upper arms to a conductive state and sets all lower arms to a non-conductive state, and a lower arm three-phase short-circuit control that sets all upper arms to a non-conductive state and sets all lower arms to a conductive state. When switching between the two short-circuit controls, a conduction overlap period in which the conductive (Continued)

state of said upper arms and the conductive state of said lower arms overlap may be generated.

2 Claims, 10 Drawing Sheets

(51) Int. Cl.
  *H02M 7/5387* (2007.01)
  *H02P 27/08* (2006.01)
(58) Field of Classification Search
  USPC .......................................................... 318/139
  See application file for complete search history.

(56) References Cited

U.S. PATENT DOCUMENTS

| | | | |
|---|---|---|---|
| 2011/0040519 A1 | | 2/2011 | Yeh et al. |
| 2012/0293100 A1* | | 11/2012 | Aoki ..................... H02P 27/085 |
| | | | 318/400.28 |
| 2013/0049665 A1* | | 2/2013 | Oyobe ....................... H02P 3/22 |
| | | | 318/489 |
| 2013/0127383 A1 | | 5/2013 | Kawamura |
| 2013/0204477 A1 | | 8/2013 | Sakata et al. |
| 2015/0035462 A1* | | 2/2015 | Kishimoto .............. H02P 27/08 |
| | | | 318/400.13 |

FOREIGN PATENT DOCUMENTS

| | | |
|---|---|---|
| JP | 2007-245966 A | 9/2007 |
| JP | 2011-182578 A | 9/2011 |
| JP | 2012-65425 A | 3/2012 |
| JP | 2012-110200 A | 6/2012 |
| JP | 2015-19561 A | 1/2015 |

* cited by examiner

INVERTER SHORT-CIRCUITING CONTROL

ELECTRIC POWER SYSTEM

TECHNICAL FIELD

The present invention relates to an electric power system that includes an inverter including upper arms and lower arms of three phases (a U phase, a V phase and a W phase).

BACKGROUND ART

An object of U.S. Patent Application Publication No. 2013/0204477 (referred to as "US 2013/0204477 A1" below) is to, in the event of a collision, promptly discharge electric charge stored in a smoothing capacitor while further appropriately protecting an inverter and a three-phase alternating current motor ([0006] and Abstract). To achieve the object, in US 2013/0204477 A1, after a collision has been detected, all the upper arm transistors T11 to T13, T21 to T23 of inverters 41, 42 are turned off, and all the lower arm transistors T14 to T16, T24 to T26 are turned on. Then, when no counter-electromotive force is generated in motors MG1, MG2, a gate voltage V2 lower than a gate voltage V1 at which each upper arm transistor completely turn on is applied to at least one of the upper arm transistors T11 to T13, T21 to T23 of the inverters 41, 42. In addition, among the lower arm transistors T14 to T16, T24 to T26 of the inverters 41, 42, lower arm transistors that are connected in series with the upper arm transistor to which the gate voltage V2 is applied is turned on (Abstract).

An object of Japanese Laid-Open Patent Publication No. 2011-182578 (referred to as "JP 2011-182578 A" below) is to provide a power converting device that can realize overheat protection and discharge electric charge of a capacitor ([0004] and Abstract). To achieve the object, JP 2011-182578 A discloses that a temperature sensor 27 detects a temperature of a lower arm transistor 24. A control circuit 26 simultaneously turns on an upper arm transistor 23 and the lower arm transistor 24 while imposing a current limit on the lower arm transistor 24, and then electric charge of a high voltage capacitor 25 is discharged via the transistors 23, 24. In addition, when the temperature of the lower arm transistor 24 detected by the temperature sensor 27 reaches a specified value, the control circuit 26 turns off the lower arm transistor 24 (Abstract).

SUMMARY OF INVENTION

As described above, according to US 2013/0204477 A1, when counter-electromotive force is generated in the motors MG1, MG2, (i.e., when power generation amounts of the motors MG1, MG2 are large), all the upper arm transistors T11 to T13, T21 to T23 are turned off, and all the lower arm transistors T14 to T16, T24 to T26 are turned on (Abstract). In this case, heat generating portions are limited to the lower arm transistors T14 to T16, T24 to T26. From viewpoints of protection of lower arm transistors (switching elements) and an increase of heat generation amounts (or quick deceleration of the motors MG1, MG2 (electric motors)), there is a room for improvement.

JP 2011-182578 A relates to control of a boost converter 20 (transistors 23, 24) for discharging electric charge of the capacitor 25, but does not study control of an inverter 30 (transistors 31 to 36).

In this regard, necessity to quickly decelerate an electric motor by performing inverter control at the time of occurrence of an abnormality is not limited to vehicles.

The present invention has been made by taking the above task into account. An object of the present invention is to provide an electric power system that can quickly decelerate an electric motor at the time of occurrence of an abnormality.

An electric power system according to the present invention includes: an electric motor; an electric power source; an inverter including upper arms and lower arms of a U phase, a V phase and a W phase; a control device configured to control the inverter to thereby control power supply from the electric power source to the electric motor; a capacitor connected in parallel to the inverter at a direct current end side of the inverter; and an abnormality detecting device configured to detect an abnormality for which the electric motor needs to be stopped or an output of the electric motor needs to be reduced, and when the abnormality detecting device detects the abnormality, the control device performs switching control to alternately switch between upper arm three-phase short-circuiting control and lower arm three-phase short-circuiting control, wherein, in the upper arm three-phase short-circuiting control, all the upper arms are placed in an energization state while all the lower arms are placed in a non-energization state, and in the lower arm three-phase short-circuiting control, all the upper arms are placed in a non-energization state while all the lower arms are placed in an energization state.

According to the present invention, when an abnormality for which an electric motor needs to be stopped or an output of the electric motor needs to be reduced is detected, the upper arm three-phase short-circuiting control and the lower arm three-phase short-circuiting control are alternately performed. In both the three-phase short-circuiting control, electric current is rapidly increased in a closed circuit. Consequently, it is possible to rapidly convert kinetic energy of the electric motor into heat. Thus, it is possible to rapidly decelerate or rapidly stop the electric motor.

Further, according to the present invention, both of the upper arm three-phase short-circuiting control and the lower arm three-phase short-circuiting control are used. Consequently, compared to a case where only one of the upper arm three-phase short-circuiting control and the lower arm three-phase short-circuiting control is performed, it is possible to increase deceleration of the electric motor while dispersing heat generating portions. Thus, it is possible to enhance deceleration of the electric motor while protecting the upper arms and the lower arms from heat.

The control device may be configured to, when switching between the upper arm three-phase short-circuiting control and the lower arm three-phase short-circuiting control, generate an energization overlap period in which a state where electric current flows through the upper arms (energization state) and a state where electric current flows through the lower arms (energization state) overlap each other. Consequently, it is possible to immediately discharge electrical charge accumulated in the capacitor connected in parallel to the inverter, and thus improve safety.

The control device may cause the energization overlap period after start of the switching control to be longer than the energization overlap period at start of the switching control. When at least the energization overlap period is generated, discharging of the electrical charge of the capacitor progresses, and the voltage of the capacitor is lowered. By lengthening the energization overlap period in a state of the lowered voltage of the capacitor, it is possible to shorten an electrical discharge time while avoiding damage to the inverter.

The electric power system may be applied to an electrical vehicle including the electric motor as a drive source, and the abnormality detecting device may be a collision detecting device configured to detect collision of the electrical vehicle. Consequently, even when wheels of the vehicle spin after collision of the electrical vehicle, it is possible to improve safety after the collision by immediately decelerating or stopping the spinning wheels.

In addition, when the energization overlap period is generated, it is possible to improve safety after the collision by immediately discharging electrical charge of the capacitor.

DESCRIPTION OF EMBODIMENTS

I. Embodiment

I-A. Configuration

[I-A-1. Entire Configuration of Electrical Vehicle 10]

Figure 1:
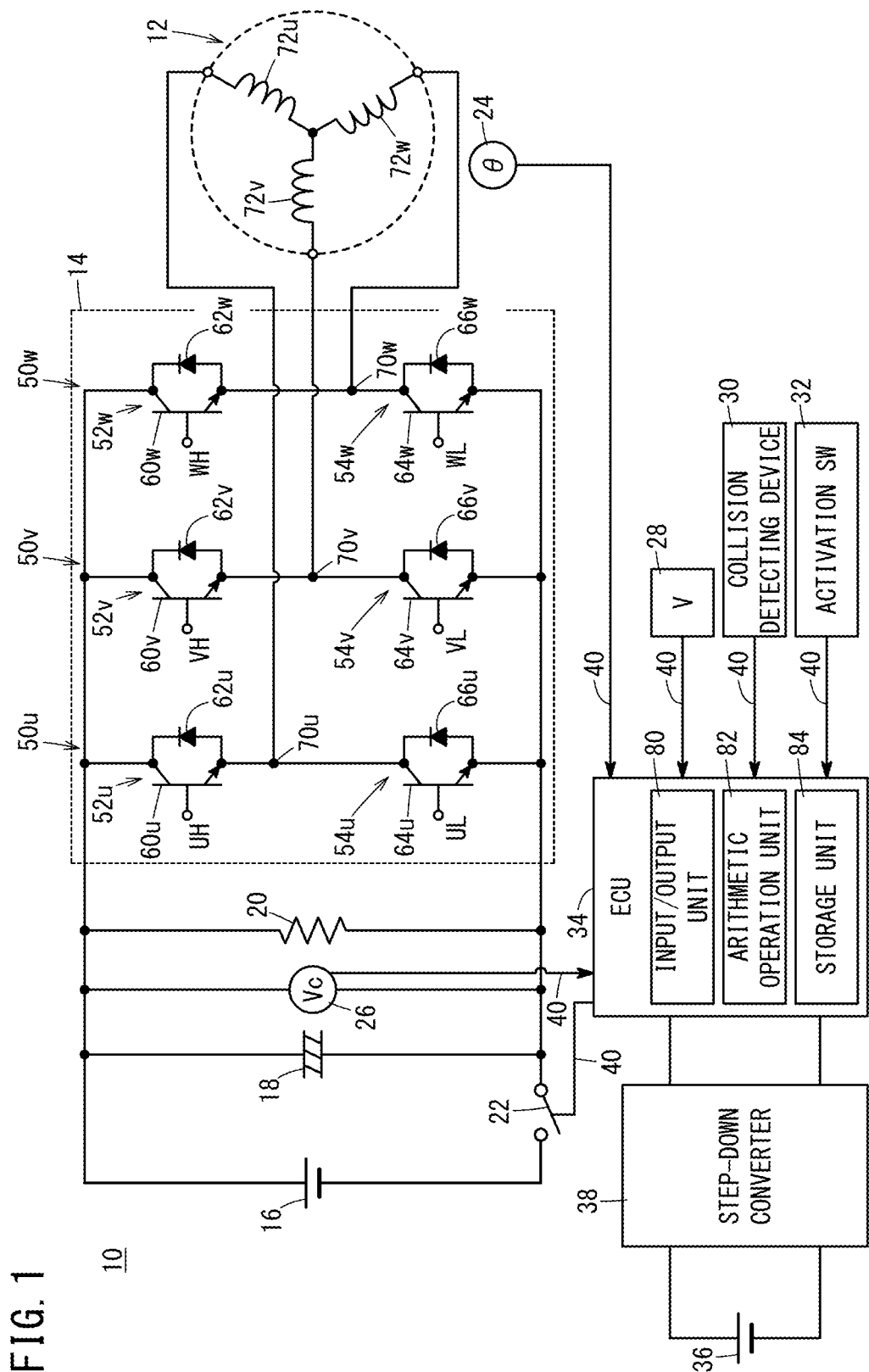
FIG. 1 is a schematic configuration diagram of an electrical vehicle of an electric power system according to an embodiment of the present invention.

FIG. 1 is a schematic configuration diagram of an electrical vehicle 10 (also referred to as a "vehicle 10" below) that functions as an electric power system according to an embodiment of the present invention. The vehicle 10 includes a traction motor 12 (also referred to as the "motor 12" or the "drive motor 12" below), an inverter 14, a high voltage battery 16, a capacitor 18, a resistance 20, a contactor 22, a resolver 24, a voltage sensor 26, a vehicle speed sensor 28, a collision detecting device 30, an activation switch 32, an electronic control unit 34 (also referred to as the "ECU 34" below), a low voltage battery 36 and a step-down (voltage buck) converter 38.

In this regard, similar to JP 2011-182578 A, a DC/DC converter may be provided between the inverter 14 and the high voltage battery 16 (also referred to as the "battery 16" below).

[I-A-2. Motor 12]

The motor 12 is of a three-phase alternating current (AC) brushless type. The motor 12 generates a drive force based on electric power supplied from the battery 16, and rotates wheels (not shown) via a transmission (not shown) by the drive force. The motor 12 outputs to the battery 16 electric power (regenerative electric power Preg) [W] generated by regeneration. The regenerative electric power Preg may be outputted to an auxiliary machine that is not shown.

[I-A-3. Inverter 14]

The inverter 14 employs a three-phase full bridge type configuration, and performs to DC-to-AC conversion. More specifically, the inverter 14 converts a direct current into a three-phase alternating current, and supplies the three-phase alternating current to the motor 12, and supplies to the battery 16 a direct current after AC-DC conversion accompanied by a regeneration operation.

As shown in FIG. 1, the inverter 14 includes three-phase arm units $50u$, $50v$ and $50w$. The arm units $50u$, $50v$, $50w$ include respective upper arms $52u$, $52v$, $52w$, and respective lower arms $54u$, $54v$, $54w$.

The upper arms $52u$, $52v$, $52w$ include upper arm switching elements $60u$, $60v$, $60w$ (referred to as the "upper arm SW elements $60u$, $60v$, $60w$" or the "SW elements $60u$, $60v$, $60w$" below), and diodes $62u$, $62v$, $62w$.

Similarly, the lower arms $54u$, $54v$, $54w$ include lower arm switching elements $64u$, $64v$, $64w$ (referred to as the "lower arm SW elements $64u$, $64v$, $64w$" or the "SW elements $64u$, $64v$, $64w$" below), and diodes $66u$, $66v$, $66w$.

For the SW elements $60u$, $60v$, $60w$, $64u$, $64v$, $64w$, for example, insulated gate bipolar transistors (IGBT) are used. Alternatively, for the SW elements $60u$, $60v$, $60w$, $64u$, $64v$, $64w$, MOSFETs or the like may be used.

In the arm units $50u$, $50v$, $50w$, middle points $70u$, $70v$, $70w$ between the upper arms $52u$, $52v$, $52w$ and the lower arms $54u$, $54v$, $54w$ are connected to respective windings $72u$, $72v$, $72w$ of the motor 12.

The arm units $50u$, $50v$, $50w$ will be collectively referred to as arm units 50 below. The upper arms $52u$, $52v$, $52w$ will be collectively referred to as upper arms 52 below. The lower arms $54u$, $54v$, $54w$ will be collectively referred to as lower arms 54 below. The upper arm SW elements $60u$, $60v$, $60w$ will be collectively referred to as upper arm SW elements 60 below. The lower arm SW elements $64u$, $64v$, $64w$ will be collectively referred to as lower arm SW elements 64 below. The windings $72u$, $72v$, $72w$ will be collectively referred to windings 72 below.

Each upper arm SW element 60 and each lower arm SW element 64 are driven by drive signals UH, VH, WH, UL, VL, WL from the ECU 34. The drive signals UH, VH, WH will be also referred to as the upper arm drive signals UH, VH, WH below. The drive signals UL, VL, WL will be also referred to as the lower arm drive signals UL, VL, WL below. FIG. 1 does not show signal lines to each upper arm SW element 60 and each lower arm SW element 64 from the ECU 34.

[I-A-4. High Voltage Battery 16]

The high voltage battery 16 comprises an electric energy storage device (energy storage) that includes a plurality of battery cells and can output a high voltage (several hundreds of volts). Lithium ion secondary cells, nickel-hydrogen secondary cells or the like can be used for the high voltage battery 16. In the present embodiment, the lithium ion secondary cells are used. Instead of the battery 16, an electric energy storage device such as a capacitor can be used.

[I-A-5. Capacitor 18, Resistance 20 and Contactor 22]

The capacitor 18 is a smoothing capacitor that suppresses voltage fluctuation between the inverter 14 and the battery 16 (direct current end side). The resistance 20 is connected in parallel to the capacitor 18, and is an electrical discharge resistance for discharging electrical charge of the capacitor 18 when the vehicle 10 stops or the like. The contactor 22 is disposed between the inverter 14 and the battery 16, and is turned on and off based on a command from the ECU 34.

[I-A-6. Resolver 24, Voltage Sensor 26 and Vehicle Speed Sensor 28]

The resolver 24 detects an electrical angle θ that is a rotation angle of an output shaft or a rotor of the motor 12 that is not shown (a rotation angle on a coordinate system fixed to a stator of the motor 12 that is not shown).

The voltage sensor 26 detects a voltage Vc of the capacitor 18 (also referred to as the "capacitor voltage Vc" below) [V]. The capacitor voltage Vc also indicates a direct current end voltage of the inverter 14. The vehicle speed sensor 28 detects a speed V [km/h] of the vehicle 10.

[I-A-7. Collision Detecting Device 30 and Activation Switch 32]

The collision detecting device 30 (abnormality detecting device) detects collision between the vehicle 10 and an external object (another car, a person, a wall, or the like) and notifies the ECU 34 of the collision. The activation switch 32 switches between on and off of the motor 12 to switch between allowing and not-allowing the vehicle 10 to drive.

[I-A-8. ECU 34]

The ECU 34 controls the motor 12 via the inverter 14, and includes an input/output unit 80, an arithmetic operation unit 82 and a storage unit 84, as shown in FIG. 1.

The input/output unit 80 inputs and outputs signals to and from each unit of the vehicle 10 via signal lines 40 (communication line), and performs input of electric power from the low voltage battery 36. The input/output unit 80 includes an A/D converter circuit (not shown) that converts an inputted analog signal into a digital signal.

The arithmetic operation unit 82 performs an arithmetic operation based on each signal from the resolver 24, the voltage sensor 26, the vehicle speed sensor 28, the collision detecting device 30 and the activation switch 32. Further, the arithmetic operation unit 82 generates the upper arm drive signals UH, VH, WH and the lower arm drive signals UL, VL, WL with respect to the inverter 14 based on the arithmetic operation result.

The arithmetic operation unit 82 according to the present embodiment executes electrical discharge control at the end of an operation of the vehicle 10 or a time of occurrence of collision. In the electrical discharge control, the regenerative electric power Preg of the rotating (idling) motor 12 is discharged to thereby decelerate or stop the motor 12. In addition, in the electrical discharge control, remaining electric power of the capacitor 18 is discharged.

According to the electrical discharge control or the like, the arithmetic operation unit 82 calculates, for example, a mechanical angle θmot of the motor 12 based on the electrical angle θ of the resolver 24. The arithmetic operation unit 82 calculates the motor rotational speed (number of rotations per unit time) Nmot [rpm or rad/sec] based on the electrical angle θ or the mechanical angle θmot. According to the electrical discharge control, the arithmetic operation unit 82 executes power supply control for continuing electric power supply to the ECU 34 until the motor 12 stops and electrical discharge of the capacitor 18 is finished.

The arithmetic operation unit 82 is operated by executing programs stored in the storage unit 84. The programs may be supplied from an outside via a wireless communication device (a mobile telephone or a smartphone) that is not shown. Part of the programs may be configured as hardware (circuit components).

The storage unit 84 is made up of a RAM (Random Access Memory) that stores imaging signals converted into digital signals, temporary data used for various arithmetic operations, etc., a ROM (Read Only Memory) that stores execution programs, tables, maps, etc.

[I-A-9. Low Voltage Battery 36 and Step-Down Converter 38]

The low voltage battery 36 is an electric energy storage device that can output a low voltage (12 volts in the present embodiment). For example, a secondary battery such as a lead-acid battery can be used for the low voltage battery 36. The step-down converter 38 steps down an output voltage of the low voltage battery 36 and outputs the output voltage to the ECU 34.

I-B. Various Types of Control

[I-B-1. Electrical Discharge Control]

(I-B-1-1. Entire Flow of Electrical Discharge Control)

Next, the electrical discharge control according to the present embodiment will be described. As described above, in the electrical discharge control, the regenerative electric power Preg of the rotating (idling) motor 12 is discharged to thereby decelerate or stop the motor 12. In addition, according to the electrical discharge control, the residual electric power of the capacitor 18 is discharged.

Figure 2:
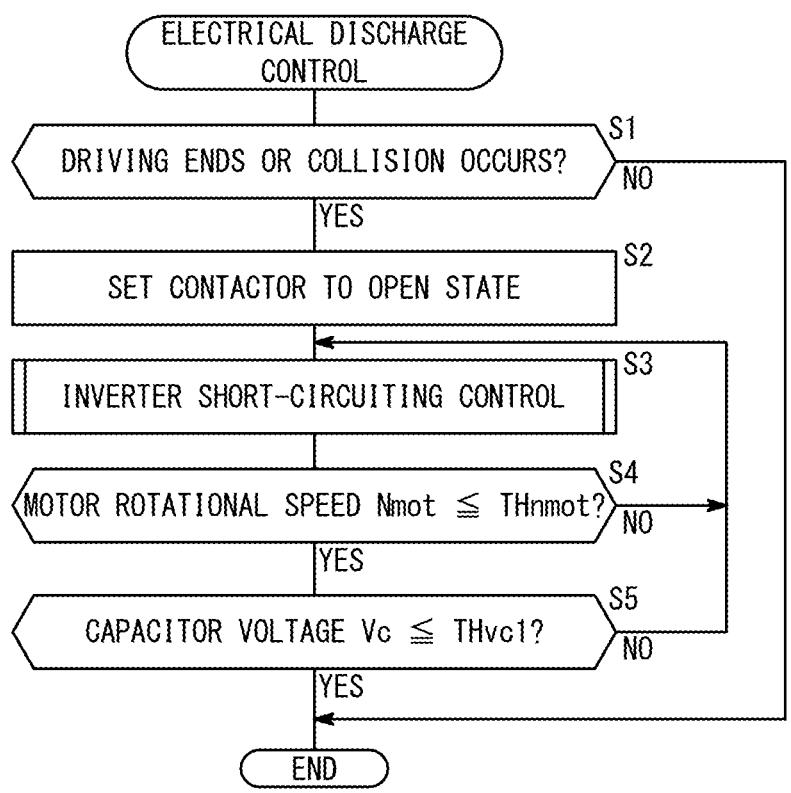
FIG. 2 is a flowchart of electrical discharge control according to the embodiment.

FIG. 2 is a flowchart of the electrical discharge control according to the present embodiment. In step S1, the ECU 34 determines whether or not driving of the vehicle 10 has ended or collision of the vehicle 10 has occurred.

Regarding the end of the driving of the vehicle 10, when, for example, the activation switch 32 of the vehicle 10 is turned off, the ECU 34 can determine that the driving of the vehicle 10 has ended. Alternatively, when the vehicle speed V from the vehicle speed sensor 28 becomes a vehicle speed threshold THv or less, the ECU 34 may make such a determination. The vehicle speed threshold THv can be, for example, zero or a near-zero value. Control of power supply to the ECU 34 in a case where the activation switch 32 is turned off will be described below. Whether or not collision of the vehicle 10 has occurred can be determined based on a signal (collision signal) from the collision detecting device 30.

When neither end of driving of the vehicle 10 nor collision of the vehicle 10 occurs (S1: NO), the current electrical discharge control is terminated. In this case, normal control such as power running control for driving the motor 12 to thereby drive the vehicle 10 or deceleration regeneration control for performing regeneration by the motor 12 to thereby decelerate the vehicle 10 is performed. After a predetermined time has elapsed since the termination of the current electrical discharge control, the electrical discharge control is resumed from step S1. In a case where driving of the vehicle 10 has ended or collision of the vehicle has occurred (S1: YES), in step S2, the ECU 34 sets the contactor 22 to an open state.

In subsequent step S3, the ECU 34 executes inverter short-circuiting control (details will be described below with reference to FIG. 3). In step S4, the ECU 34 determines whether or not the motor rotational speed (number of rotations per unit time) Nmot is a threshold THnmot (also referred to as the "rotational speed threshold THnmot" or the "motor rotational speed threshold THnmot" below) or less. The threshold THnmot is a threshold for determining that the motor 12 has stopped, and can be, for example, zero or a near-zero value.

When the motor rotational speed Nmot is not the threshold THnmot or less (S4: NO), the flow returns to step S3 to continue the inverter short-circuiting control. When the motor rotational speed Nmot is the threshold THnmot or less (S4: YES), the flow proceeds to step S5.

In step S5, the ECU 34 determines whether or not the capacitor voltage Vc is a threshold THvc1 (also referred to as the "voltage threshold THvc1" or the "first voltage threshold THvc1" below) or less. The threshold THvc1 is a threshold for determining that electrical discharging of the capacitor 18 has been finished, and can be, for example, zero or a near-zero value.

When the capacitor voltage Vc is not the threshold THvc1 or less (S5: NO), the flow returns to step S3 to continue the inverter short-circuiting control. When the capacitor voltage Vc is the threshold THvc1 or less (S5: YES), the current electrical discharge control is terminated.

(I-B-1-2. Inverter Short-Circuiting Control (S3 in FIG. 2))
(I-B-1-2-1. Flow of Inverter Short-Circuiting Control)

Figure 3:
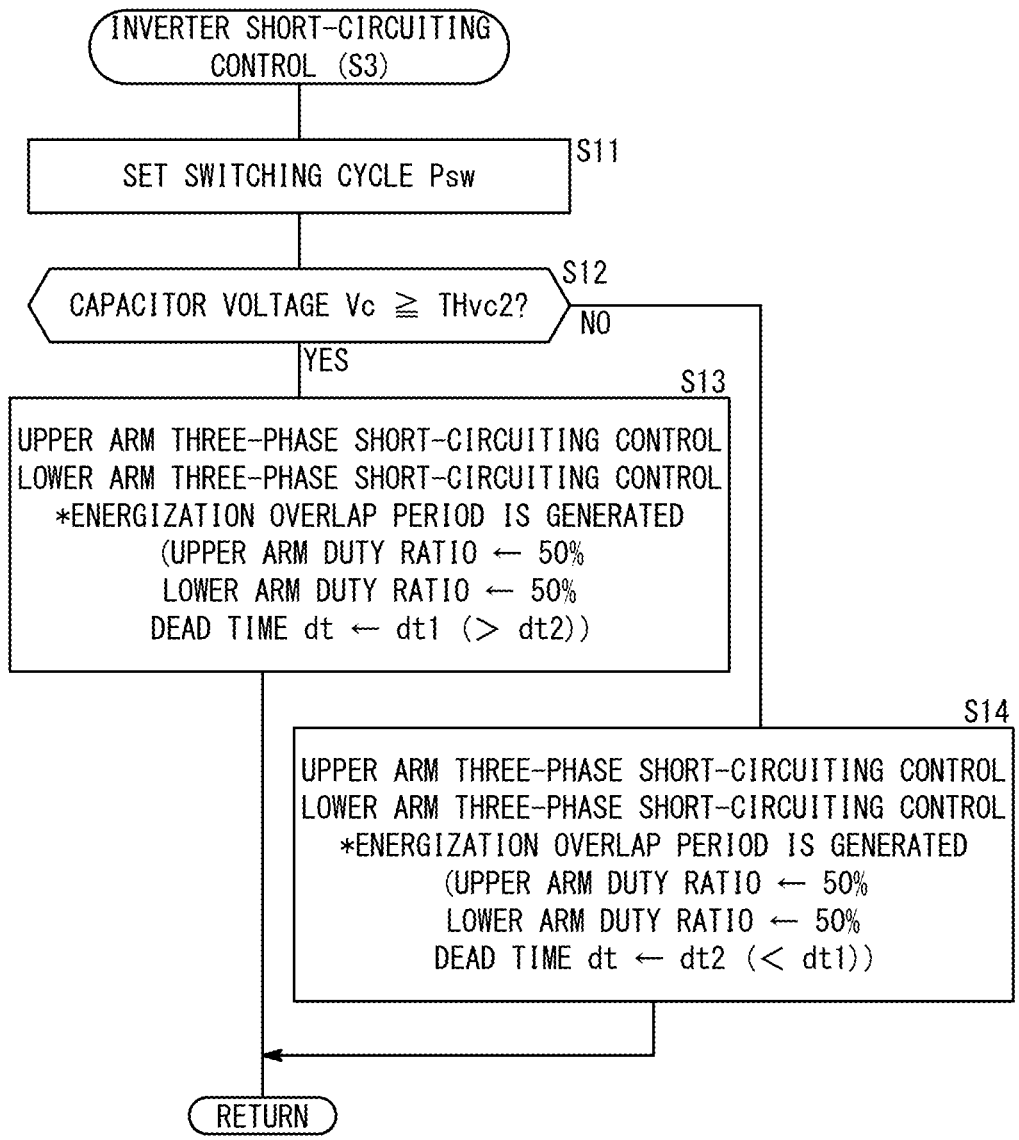
FIG. 3 is a flowchart (details of S3 in FIG. 2) of inverter short-circuiting control according to the embodiment.
Figure 4:
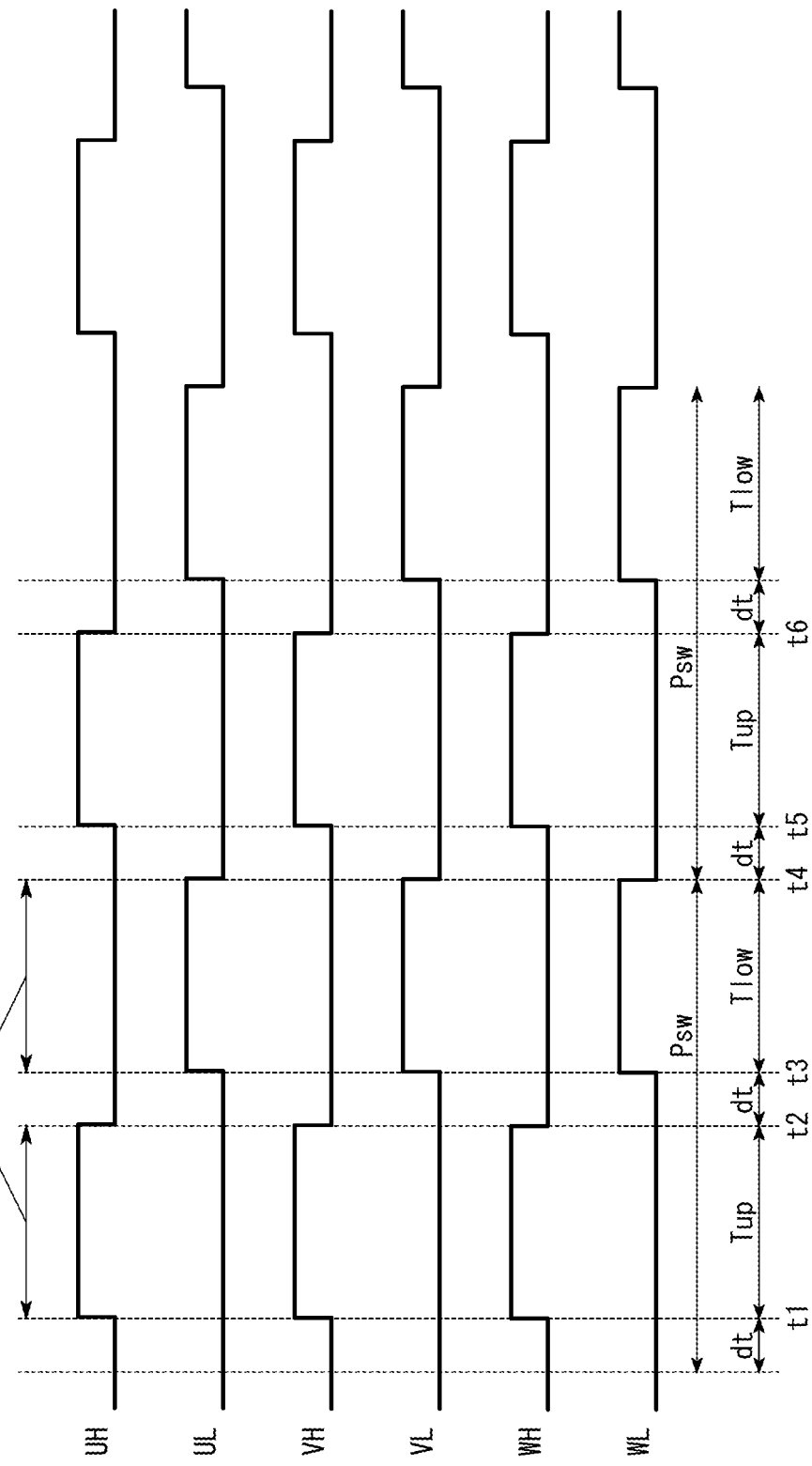
FIG. 4 is a diagram showing a relationship between upper arm drive signals, lower arm drive signals, dead times and various types of control according to the embodiment.

FIG. 3 is a flowchart (details of S3 in FIG. 2) of the inverter short-circuiting control according to the present embodiment. FIG. 4 is a diagram showing a relationship between the upper arm drive signals UH, VH, WH, the lower arm drive signals UL, VL, WL, dead times dt and various types of control according to the present embodiment.

In step S11 in FIG. 3, the ECU 34 sets a switching cycle Psw for controlling output periods Tup (also referred to as the "upper arm drive periods Tup" or the "periods Tup" below) of the upper arm drive signals UH, VH, WH, and output periods Tlow (also referred to as the "lower arm drive periods Tlow" or the "periods Tlow" below) of the lower arm drive signals UL, VL, WL.

As shown in FIG. 4, the switching cycle Psw includes the upper arm drive period Tup, the lower arm drive period Tlow, the two dead times dt set between the upper arm drive period Tup and the lower arm drive period Tlow.

Part of the drive signals UH, VH, WH may be formed into comb-teeth shapes, and periods during which the drive signals UH, VH, WH are not outputted may be provided in part of the upper arm drive periods Tup. Similarly, periods during which the drive signals UL, VL, WL are not outputted may be provided in part of the lower arm drive periods Tlow.

In the inverter short-circuiting control according to the present embodiment, pulse width modulation (PWM) is used. Instead, pulse frequency modulation (PFM) may be used. In a case of PWM, if the switching cycle Psw used for the normal control and the inverter short-circuiting control is set to a fixed value, step S11 may be skipped.

In step S12, the ECU 34 determines whether or not the capacitor voltage Vc is a threshold THvc2 (also referred to as the "voltage threshold THvc2" or the "second voltage threshold THvc2" below) or more. The threshold THvc2 is a threshold for switching the length of the dead time dt, and is a value greater than the first voltage threshold THvc1 (S5 in FIG. 2).

In any of the cases that the capacitor voltage Vc is the threshold THvc2 or more (S12: YES) and the capacitor voltage Vc is not the threshold THvc2 or more (S12: NO), the ECU 34 executes upper arm three-phase short-circuiting control and lower arm three-phase short-circuiting control (S13, S14). In the present embodiment, an energization overlap period Tov (FIGS. 7 and 9) is generated in response to the upper arm three-phase short-circuiting control and the lower arm three-phase short-circuiting control.

A dead time dt1 (S13) is used when the capacitor voltage Vc is the threshold THvc2 or more (S12: YES), and a dead time dt2 (S14) is used when the capacitor voltage Vc is not the threshold THvc2 or more (S12: NO). The dead time dt2 is set to be shorter than the dead time dt1.

The upper arm three-phase short-circuiting control and the lower arm three-phase short-circuiting control, and the energization overlap period Tov will be described below with reference to FIGS. 4 to 10B.

(I-B-1-2-2. Upper Arm Three-Phase Short-Circuiting Control)

Figure 5:
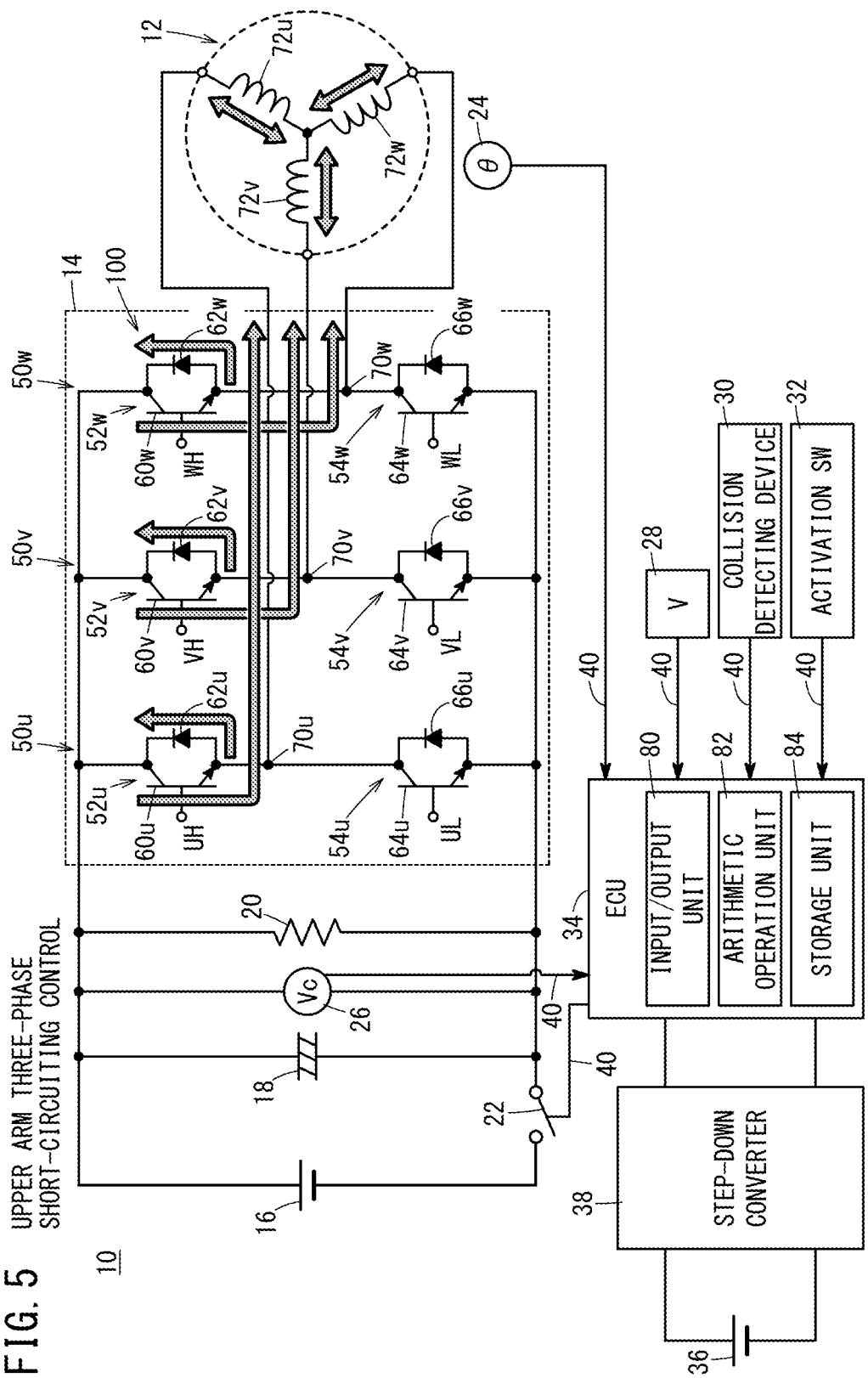
FIG. 5 is a view showing flow of an electric current during upper arm three-phase short-circuiting control according to the embodiment.

FIG. 5 is a view showing flow of an electric current I during the upper arm three-phase short-circuiting control according to the present embodiment. A plurality of bold arrows in FIG. 5 indicate the flow of the electric current I (the same applies to FIGS. 6 and 7). As shown in FIG. 5, in the upper arm three-phase short-circuiting control, a closed circuit 100 including the three phase upper arms 52u, 52v, 52w and the motor 12 is short-circuited. Thus, the relatively large current I flows in the closed circuit 100. Hence, electrical energy (regenerative electric power Preg) produced by kinetic energy of the motor 12 is converted into heat energy in the upper arm SW elements 60u, 60v, 60w and the like. Consequently, it is possible to increase the deceleration of the motor 12.

When executing the upper arm three-phase short-circuiting control, the ECU 34 simultaneously outputs the drive signals UH, VH, WH to the upper arms 52u, 52v, 52w (see FIG. 4). In this regard, as described below with reference to FIGS. 8 and 9, the periods Tup (e.g., a period from time point t1 to time point t2, a period from time point t5 to time point t6 in FIG. 4) for outputting the upper arm drive signals UH, VH, WH, and a period for short-circuiting the closed circuit 100 are slightly different. When to output the upper arm drive signals UH, VH, WH and the output periods Tup thereof will be described below together with the upper arm drive signals UL, VL, WL.

(I-B-1-2-3. Lower Arm Three-Phase Short-Circuiting Control)

Figure 6:
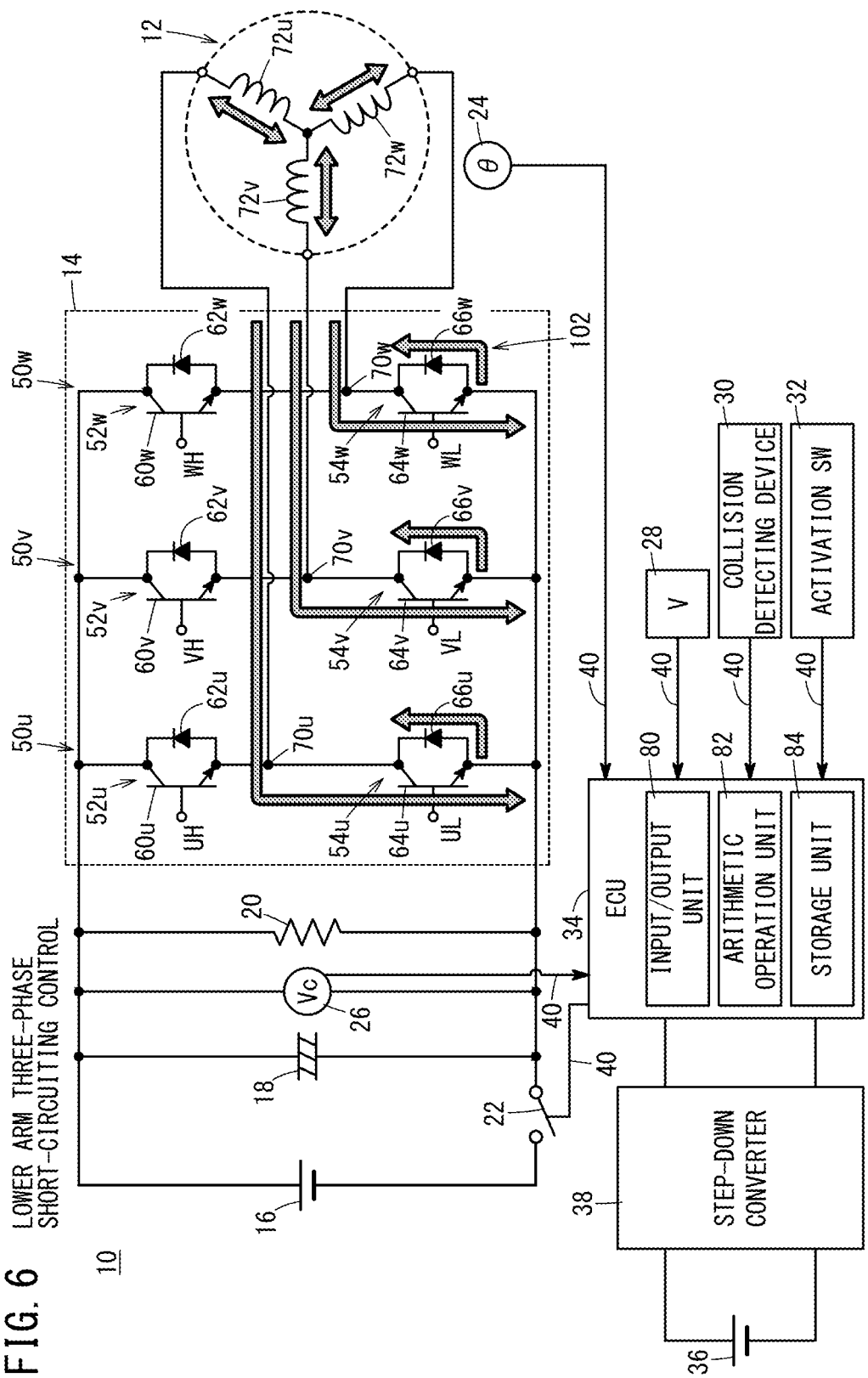
FIG. 6 is a view showing flow of the electric current during lower arm three-phase short-circuiting control according to the embodiment.

FIG. 6 is a view showing flow of an electric current I during the lower arm three-phase short-circuiting control according to the present embodiment. As shown in FIG. 6, according to the lower arm three-phase short-circuiting control, a closed circuit 102 including the three phase lower arms 54u, 54v, 54w and the motor 12 is short-circuited. By this means, the relatively large current I flows in the closed circuit 102. Hence, the electrical energy produced by the kinetic energy of the motor 12 is converted into heat energy in the lower arm SW elements 64u, 64v, 64w, and the like. Consequently, it is possible to increase the deceleration of the motor 12.

When executing the lower arm three-phase short-circuiting control, the ECU 34 simultaneously outputs the drive signals UL, VL, WL to the lower arms 54u, 54v, 54w (see FIG. 4). In this regard, as described below with reference to FIGS. 8 and 9, the periods Tlow (e.g., between points of time t3 to t4 in FIG. 4) during which the lower arm drive signals UL, VL, WL are outputted, and a period during which the closed circuit 102 is short-circuited are slightly different. The dead time dt is a time period between the upper arm drive period Tup and the lower arm drive period Tlow (e.g., between the time points t2 and t3, and the time points t4 and t5).

In the present embodiment, when to output the upper arm drive signals UH, VH, WH and the lower arm drive signal UL, VL, WL, and the output periods Tup, Tlow are calculated as follows. That is, according to the inverter short-circuiting control, the ECU 34 sets a duty ratio DUTup of the upper arm drive signals UH, VH, WH and a duty ratio DUTlow of the lower arm drive signals UL, VL, WL in each switching period Psw, to 50%. Practically, a duty ratio DUT of the entire one switching cycle Psw is 100%, and the duty ratio DUTlow of the lower arm SW elements 64 can be calculated as a value obtained by subtracting the duty ratio DUTup of the upper arm SW elements 60 from 100%.

The duty ratios DUTup, DUTlow do not necessarily need to be set to 50%. In addition, even when the duty ratio DUT of the entire one switching cycle Psw is 100%, the total of the duty ratios DUTup, DUTlow may be less than 100%. A case where the total of the duty ratios DUTup, DUTlow is a value less than 100% includes, for example, a case where the upper arm drive signals UH, VH, WH and the lower arm drive signals UL, VL, WL in one switching cycle Psw are outputted in a comb-shaped waveform.

The ECU 34 calculates a reference value (referred to as a "reference output period Tref" below) of the output periods Tup, Tlow of the upper arm drive signals UH, VH, WH and the lower arm drive signals UL, VL, WL based on the duty ratios DUTup, DUTlow. Next, the ECU 34 calculates a target output period Ttar by subtracting the dead times dt from the reference output period Tref. As shown in FIG. 4, in the present embodiment, the dead times dt are arranged at two locations, i.e., at a beginning of the switching cycle Psw, and at a location between the output periods Tup, Tlow. Alternatively, the dead times dt may be arranged at a location between the output periods Tup, Tlow, and at an end of the switching cycle Psw.

(I-B-1-2-4. Energization Overlap Period Tov)
(I-B-1-2-4-1. Outline of Energization Overlap Period Tov)

Figure 7:
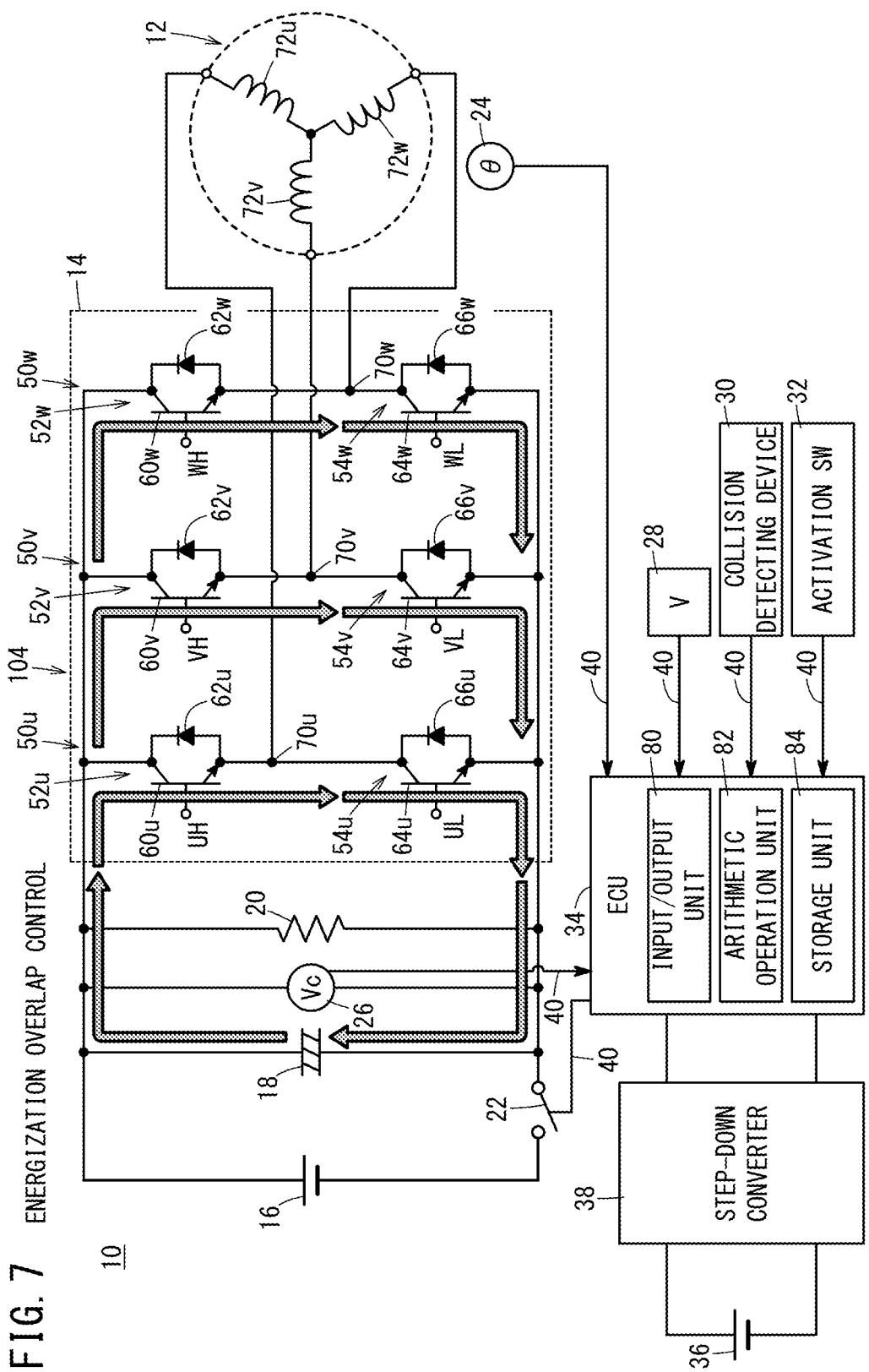
FIG. 7 is a view showing flow of the electric current during energization overlap control according to the embodiment.

FIG. 7 is a view showing flow of an electric current I during the energization overlap period Tov according to the present embodiment. As shown in FIG. 7, in the energization overlap period Tov, a closed circuit 104 including the three phase upper arms 52u, 52v, 52w, the three phase lower arms 54u, 54v, 54w, the capacitor 18 and the resistance 20 is short-circuited. Control for generating the energization overlap period Tov will be also hereinafter referred to as energization overlap control.

Figure 8:
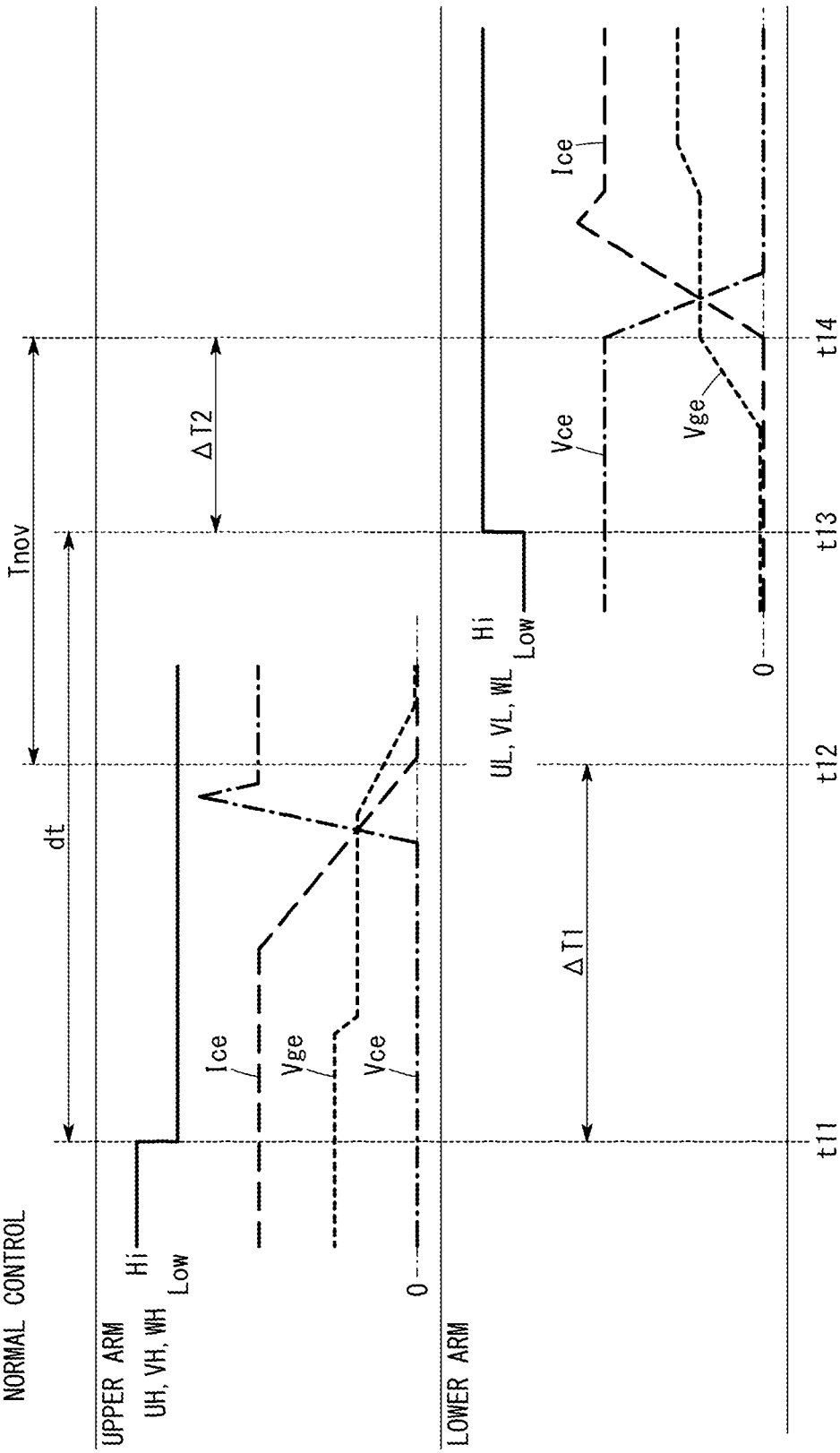
FIG. 8 is a diagram showing upper arm drive signals, lower arm drive signals, dead times, and collector-emitter voltage, gate-emitter voltage and collector-emitter current of each switching element during normal control according to the embodiment.
Figure 9:
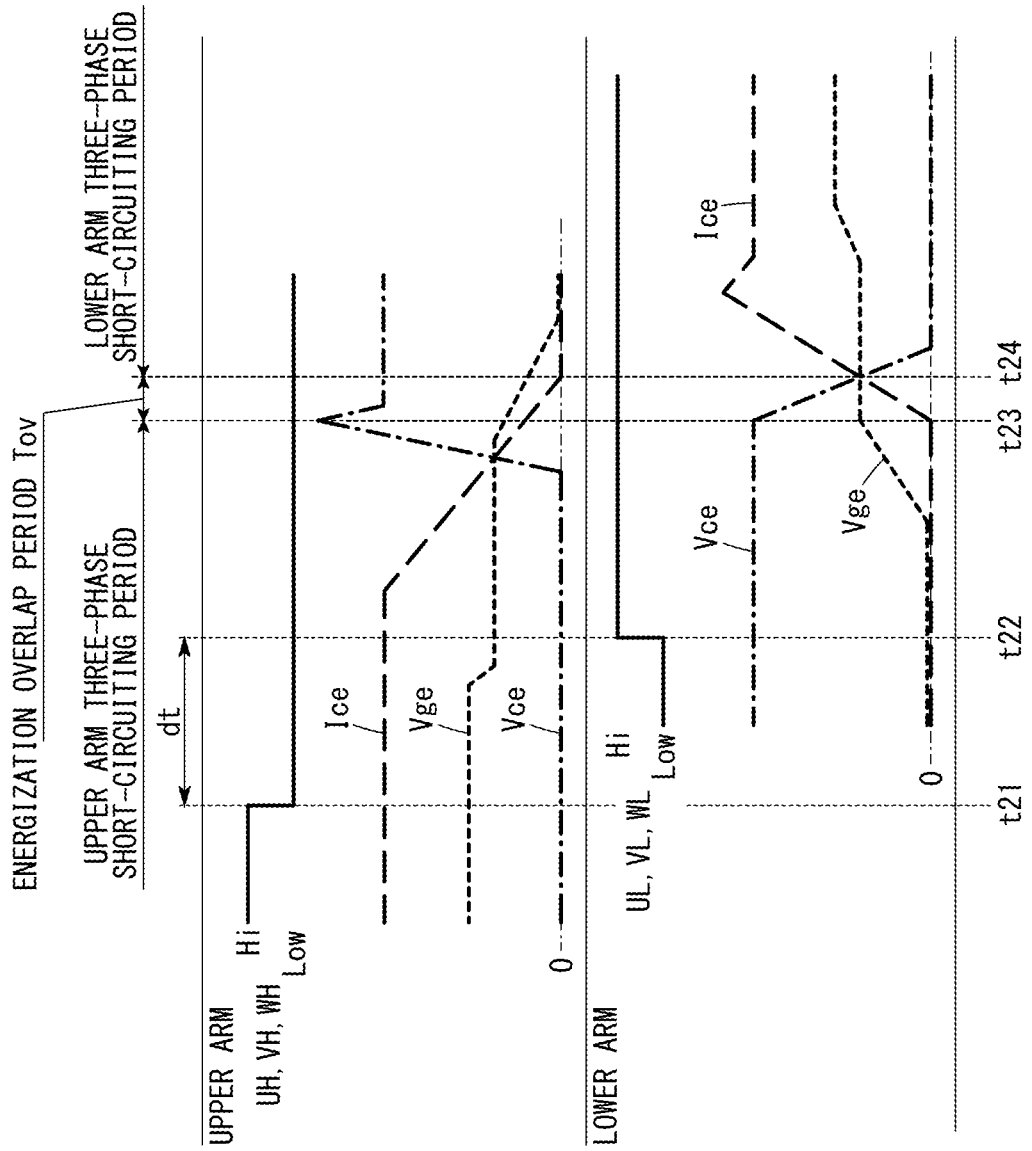
FIG. 9 is a diagram showing upper arm drive signals, lower arm drive signals, dead times, and collector-emitter voltage, gate-emitter voltage and collector-emitter current of each switching element during inverter short-circuiting control according to the embodiment.

FIG. 8 is a diagram showing the upper arm drive signals UH, VH, WH, the lower arm drive signals UL, VL, WL and the dead times dt, and collector-emitter voltage Vce, gate-emitter voltage Vge and collector-emitter current Ice of each of the SW elements 60u, 60v, 60w, 64u, 64v, 64w in the normal control according to the present embodiment. FIG. 9 is a diagram showing the upper arm drive signals UH, VH, WH, the lower arm drive signals UL, VL, WL and the dead times dt, and the collector-emitter voltage Vce, the gate-emitter voltage Vge and the collector-emitter current Ice of each of the SW elements 60u, 60v, 60w, 64u, 64v, 64w in the inverter short-circuiting control according to the present embodiment.

As shown in FIGS. 8 and 9, there is a time difference between changes of the drive signals UH, VH, WH, UL, VL, WL (from Hi to Low or from Low to Hi) and a response of the collector-emitter current Ice (also referred to as the "current Ice" below).

When, for example, the upper arm drive signals UH, VH, WH are switched from Hi to Low (0 V) at a point of time t11 in FIG. 8 related to the normal control, the current Ice becomes zero at a point of time t12, and the upper arms 52u, 52v, 52w (upper arm SW elements 60u, 60v, 60w) are actually turned off. Hence, a time period from the points of time t11 to t12 is a time difference (referred to as a "time difference ΔT1" below).

When the lower arm drive signals UL, VL, WL switch from Low to Hi at a point of time t13, the current Ice starts rising from zero at a point of time t14, and the lower arms 54u, 54v, 54w (lower arm SW elements 64u, 64v, 64w) are actually turned on. Hence, a time from the points of time t13 to t14 is a time difference (referred to as a "time difference ΔT2" below).

In the normal control, the dead times dt are set by taking the time differences ΔT1, ΔT2 into account in order to avoid occurrence of short-circuiting in a closed circuit (one of the closed circuits 100, 102, 104) including the inverter 14. That is, the dead times dt are set to be longer than the time differences ΔT1, ΔT2. Thus, a non-energization time Tnov in which the current Ice of the upper arms 52u, 52v, 52w and the current Ice of the lower arms 54u, 54v, 54w both become zero is generated.

In contrast, as shown in FIG. 9, in the inverter short-circuiting control of the present embodiment, the period Tov (energization overlap period Tov) in which ON-state (a state where the current Ice is not zero) of the upper arms 52u, 52v, 52w and ON-state (a state where the current Ice is not zero) of the lower arms 54u, 54v, 54w overlap each other is intentionally generated (from points of time t23 to t24 in FIG. 9).

In other words, the dead times dt in the inverter short-circuiting control are set to values shorter than the time differences ΔT1, ΔT2. As described above, the dead time dt is a period from a point of time (point of time t21) at which the upper arm drive signals UH, VH, WH are switched from Hi to Low (0 V) to a point of time (point of time t22) at which the lower arm drive signals UL, VL, WL are switched from Low to Hi. The dead time dt is set to a value shorter than the time differences ΔT1, ΔT2 to thereby generate a short-circuit state in the closed circuit 104 during a predetermined minute period of time (see FIG. 7).

In this case, a relatively large current I flows in the closed circuit 104. Hence, electrical energy (regenerative electric power Preg) produced by the kinetic energy of the motor 12 is converted into heat energy in the SW elements 60u, 60v, 60w, 64u, 64v, 64w, etc. Consequently, it is possible to increase the deceleration of the motor 12. In addition, the electrical energy stored in the capacitor 18 is also converted into heat energy in the SW elements 60u, 60v, 60w, 64u, 64v, 64w, etc. Thus, it is possible to quickly discharge the electrical charge of the capacitor 18.

(I-B-1-2-4-2. Length of Dead Time dt)

In the energization overlap control according to the present invention, when electrical discharging of the capacitor 18 progresses, the dead times dt are shortened. That is, in step S12 in FIG. 3, if the capacitor voltage Vc is the threshold THvc2 or more (S12: YES), the ECU 34 uses dt1 as the dead time dt (S13). If the capacitor voltage Vc is not the threshold THvc2 or more (S12: NO), the ECU 34 uses dt2 as the dead time dt (S14). The dead time dt2 is shorter than the dead time dt1. Hence, compared to the case of the dead time dt1, in the case of the dead time dt2, the energization overlap period Tov is longer.

Figure 10A:
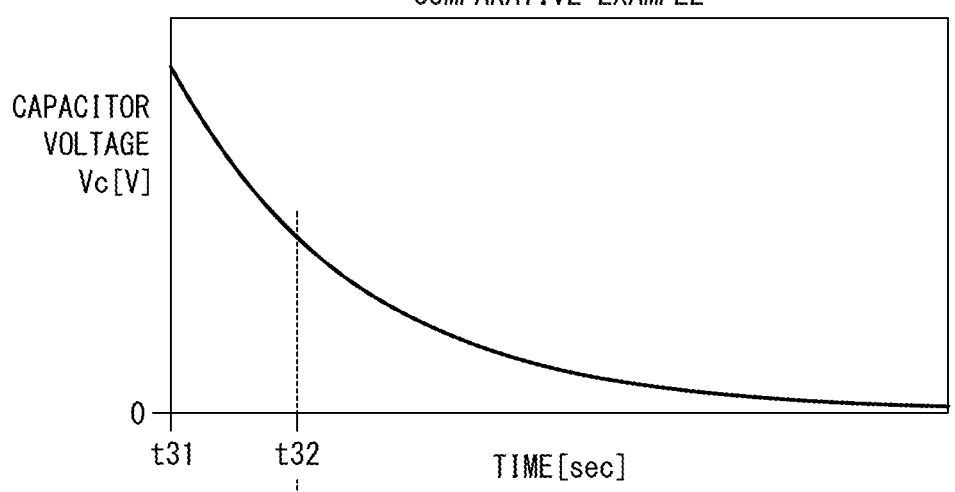
FIG. 10A shows electrical discharge characteristics in a case where electrical discharge control according to a comparative example is used.
Figure 10B:
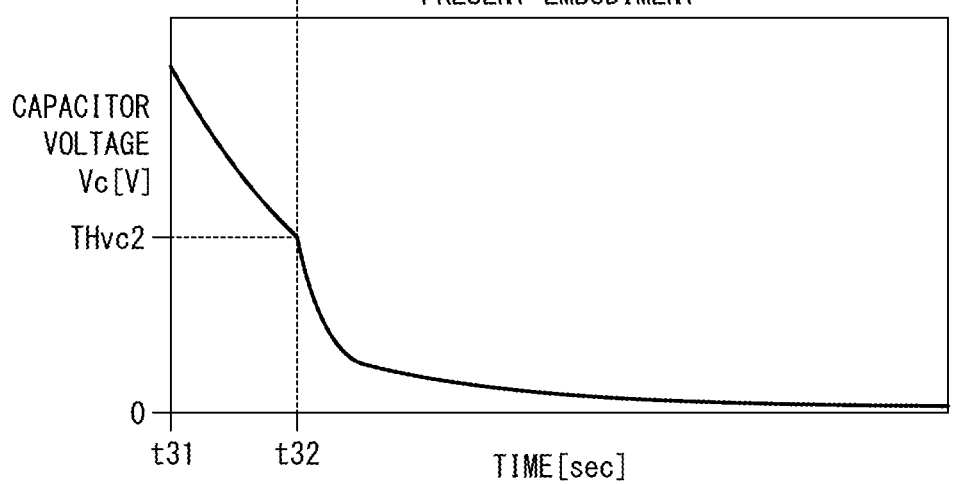
FIG. 10B shows electrical discharge characteristics in a case where electrical discharge control according to the present embodiment is used.

FIG. 10A shows electrical discharge characteristics in a case of use of electrical discharge control according to a comparative example. FIG. 10B shows electrical discharge characteristics in a case of use of electrical discharge control according to the present embodiment. In FIGS. 10A and 10B, the horizontal axis indicates a time, and the vertical axis indicates the capacitor voltage Vc. In the comparative example, steps S12, S14 in FIG. 3 are not used, and only steps S11, S13 are used.

The comparative example and the present embodiment indicate the same characteristics from a point of time t31 to a point of time t32 in FIGS. 10A and 10B. At the point of time t32, the capacitor voltage Vc becomes less than the threshold THvc2 (S12: NO in FIG. 3). Therefore, in the present embodiment, the dead time dt is changed from dt1 to dt2 (<dt1) (S14). Thus, in the present embodiment, an electrical discharge time constant is decreased (or an electrical discharge amount is increased). Consequently, it is possible to quickly decelerate the motor 12 and quickly discharge the electrical charge of the capacitor 18 (see FIG. 10B).

[I-B-2. Power Supply Control to ECU 34]

As described above, when detecting that the activation switch 32 has been turned off in step S1 in FIG. 2, the ECU 34 (arithmetic operation unit 82) executes power supply control. In the power supply control, until the motor 12 stops (S4 in YES in FIG. 2) and discharging of the electrical charge of the capacitor 18 is completed (S5: YES), the step-down converter 38 is operated to continue power supply to the ECU 34.

I-C. Effect of Present Embodiment

As described above, according to the present embodiment, when collision (abnormality) of the vehicle 10 is detected (S1: YES in FIG. 2), the upper arm three-phase short-circuiting control and the lower arm three-phase short-circuiting control are alternately performed (FIGS. 2 to 4). In both the three-phase short-circuiting controls, the current I is rapidly increased in the closed circuits 100, 102 (FIGS. 5 and 6), so that it is possible to rapidly convert the kinetic energy of the motor 12 into heat. Consequently, it is possible to rapidly decelerate or rapidly stop the motor 12.

According to the present embodiment, both of the upper arm three-phase short-circuiting control and the lower arm three-phase short-circuiting control are used (FIGS. 3 and 4). Consequently, in comparison with a case where only one of the upper arm three-phase short-circuiting control and the lower arm three-phase short-circuiting control is performed, it is possible to disperse heat generating portions and increase the deceleration of the motor 12. Consequently, it is possible to protect the upper arms 52u, 52v, 52w and the lower arms 54u, 54v, 54w from heat, and increase the deceleration of the motor 12.

In the present embodiment, the ECU 34 (control device) generates the energization overlap period Tov in which the energization state of the upper arms 52u, 52v, 52w and the energization state of the lower arms 54u, 54v, 54w overlap each other when switching between the upper arm three-phase short-circuiting control and the lower arm three-phase short-circuiting control (FIGS. 3, 7 and 9). Consequently, it is possible to immediately discharge electrical charge accumulated in the capacitor 18 connected in parallel to the inverter 14, and accordingly improve safety.

In the present embodiment, the ECU 34 (control device) performs a switching control for alternately switching between the upper arm three-phase short-circuiting control and the lower arm three-phase short-circuiting control. In this case, the ECU 34 causes a dead time dt2 (S14) after start of the switching control to be shorter than a dead time dt1 (S13 in FIG. 3) at start of the switching control. Thus, the energization overlap period Tov is increased. When at least the energization overlap period Tov is generated, discharging of the electrical charge of the capacitor 18 progresses, and voltage of the capacitor 18 is decreased. By lengthening the energization overlap period Tov in a state of the lowered voltage of the capacitor 18, it is possible to shorten an electrical discharge time while avoiding damage to the inverter 14.

The present embodiment is applied to the electrical vehicle 10 including the motor 12 as the drive source (FIG. 1). The collision detecting device 30 (abnormality detecting device) detects collision of the vehicle 10 (an abnormality for which the motor 12 needs to be stopped or an output of the motor 12 needs to be reduced). Consequently, even when wheels of the vehicle spin after the collision of the vehicle 10, it is possible to improve safety after the collision by immediately decelerating or stopping the spinning wheels. In addition, since the energization overlap period Tov is generated (FIGS. 3, 7 and 9), by immediately discharging the electrical charge of the capacitor 18, it is possible to improve safety after the collision.

II. Modifications

Naturally, the present invention is not limited to the above embodiment, and can employ various configurations based on disclosure contents of this description. For example, the present invention can employ the following configuration.

<II-A. Mounting Object>

In the above embodiment, the present invention is applied to the vehicle 10 as an electric power system. However, the present invention is not limited to this from a viewpoint of use of the upper arm three-phase short-circuiting control and the lower arm three-phase short-circuiting control, for example. The present invention may be applied to another object as an electric power system, for example. The present invention is applicable to moving objects such as ships and airplanes as electric power systems, for example. Alternatively, the present invention may be applied to robots, manufacturing devices, home electric power systems and home electric appliances as electric power systems.

The vehicle 10 according to the embodiment is a narrowly defined electrical vehicle (battery vehicle) including only the motor 12 as a drive source and only the battery 16 as an electric power source (FIG. 1). However, the present invention is not limited to this from a viewpoint of use of the upper arm three-phase short-circuiting control and the lower arm three-phase short-circuiting control, for example. For example, the vehicle 10 may be a hybrid vehicle or a fuel cell vehicle.

II-B. Inverter 14

In the above embodiment, an example of use of the three upper arm SW elements 60u, 60v, 60w and the three lower arm SW elements 64u, 64v, 64w has been described (FIG. 1). However, from a viewpoint that, for example, the upper arms 52u, 52v, 52w and the lower arms 54u, 54v, 54w are configured respectively as three phases, the numbers of the SW elements 60, 64 are not limited to this. For example, the six upper arm SW elements 60 may be provided, and the two SW elements 60 may be allocated to each phase. Similarly, the six lower arm SW elements 64 also may be provided, and the two SW elements 64 may be allocated to each phase.

II-C. Electrical Discharge Control

[II-C-1. General Points]

In the above embodiment, as conditions for performing the inverter short-circuiting control, the end of the driving of the vehicle 10 and occurrence of collision of the vehicle 10 have been used (S1 in FIG. 2). However, the present invention is not limited to this from a viewpoint of use of the upper arm three-phase short-circuiting control and the lower arm three-phase short-circuiting control, for example. For example, as such conditions, only one of the end of the driving of the vehicle 10 and the occurrence of collision of the vehicle 10 may be used.

In the above embodiment, the upper arm three-phase short-circuiting control, the lower arm three-phase short-circuiting control and the energization overlap control are used in combination (FIGS. 2 to 4). However, from a viewpoint of use of the upper arm three-phase short-circuiting control and the lower arm three-phase short-circuiting control, for example, the energization overlap control may be omitted. In contrast, in a case of focusing on the energization overlap control, another configuration may be adopted in which only a control of simultaneously generating the upper arm three-phase short-circuiting control and the lower arm three-phase short-circuiting control is performed.

[II-C-2. Upper Arm Three-Phase Short-Circuiting Control and Lower Arm Three-Phase Short-Circuiting Control]

In the above embodiment, the duty ratios DUTup, DUTlow of the upper arm three-phase short-circuiting control and the lower arm three-phase short-circuiting control are set to the same values (50%) (FIGS. 3 and 4). However, the present invention is not limited to this from the viewpoint of use of the upper arm three-phase short-circuiting control and the lower arm three-phase short-circuiting control, for example. For example, one of the duty ratios DUTup, DUTlow may be higher than 50%, and the other one may be lower than 50%. Alternatively, at a beginning of start of the inverter short-circuiting control, the total of the duty ratios DUTup, DUTlow may be set to be lower than 100%, and the total of the duty ratios DUTup, DUTlow may be increased close to 100% in response to a decrease in the capacitor voltage Vc.

In the above embodiment, the upper arm three-phase short-circuiting control and the lower arm three-phase short-circuiting control are included in one switching cycle Psw (FIG. 4). However, the present invention is not limited to this from the viewpoint of use of the upper arm three-phase short-circuiting control and the lower arm three-phase short-circuiting control, for example. For example, the upper arm three-phase short-circuiting control may be performed in a first switching cycle Psw1, and the lower arm three-phase short-circuiting control may be performed in a subsequent second switching cycle Psw2. Alternatively, the upper arm three-phase short-circuiting control may be performed in the first switching cycle Psw1, the upper arm three-phase short-circuiting control may be switched to the lower arm three-phase short-circuiting control in the second switching cycle Psw2, and the lower arm three-phase short-circuiting control may be performed in a third switching cycle Psw3.

In the above embodiment, for forming the closed circuit 100 including the upper arms 52*u*, 52*v*, 52*w* and the motor 12, all the upper arms 52*u*, 52*v*, 52*w* of three phases are turned on (FIG. 5). However, from a viewpoint that, for example, the closed circuit 100 including the upper arms 52*u*, 52*v*, 52*w* and the motor 12 is short-circuited or a viewpoint that short-circuiting that uses the upper arms 52*u*, 52*v*, 52*w* and short-circuiting that uses the lower arms 54*u*, 54*v*, 54*w* are alternately switched, only the upper arms 52 of two phases or one phase (e.g., only the upper arms 52*v*, 52*w*) may be turned on. In this case, it is also possible to sequentially switch a combination of the two phases or one phase. The same applies to the lower arms 54*u*, 54*v*, 54*w*.

In the above embodiment, the SW elements 60*u*, 60*v*, 60*w* are completely turned on in the upper arm three-phase short-circuiting control, and the SW elements 64*u*, 64*v*, 64*w* are completely turned on in the lower arm three-phase short-circuiting control (FIG. 4). However, the present invention is not limited to this, from a viewpoint that, for example, the upper arm three-phase short-circuiting control and the lower arm three-phase short-circuiting control are switched.

[II-C-3. Energization Overlap Control]

In the inverter short-circuiting control (energization overlap control) according to the embodiment, the length of the dead time dt is set to two values of dt1 and dt2 (FIG. 3). However, the present invention is not limited to this, from a viewpoint that, for example, the energization overlap period Tov is lengthened (or the dead time dt is shortened) in response to a decrease in the capacitor voltage Vc or a decrease in the motor rotational speed Nmot. For example, the length of the dead time dt may be set by using a map that defines a relationship between the dead time dt and the capacitor voltage Vc or the motor rotational speed Nmot.

In the above embodiment, the capacitor voltage Vc is used as a condition for switching the length of the dead time dt (S12 in FIG. 3). However, the present invention is not limited to this, from a viewpoint of suppression of heat generation of the SW elements 60*u*, 60*v*, 60*w*, 64*u*, 64*v*, 64*w*, for example. For example, in addition to or instead of the capacitor voltage Vc, the dead time dt may be shortened in response to a decrease in the motor rotational speed Nmot or the regenerative voltage Vreg [V] of the motor 12.

In the above embodiment, the energization overlap control is started in time with start of the inverter short-circuiting control (FIGS. 2 to 4). However, the present invention is not limited to this, from a viewpoint that, for example, the energization overlap control is started at a point of time at which the capacitor voltage Vc or the regenerative voltage Vreg becomes lower. When, for example, the capacitor voltage Vc becomes equal to or less than a third voltage threshold THvc3 (THvc3>THvc2>THvc1) after start of the inverter short-circuiting control, the energization overlap control may be started.

III. Description of Reference Numerals

10 . . . electrical vehicle (electric power system)
12 . . . motor (electric motor)
14 . . . inverter
16 . . . high voltage battery (electric power source)
18 . . . capacitor
30 . . . collision detecting device (abnormality detecting device)
34 . . . ECU (control device)
52*u*, 52*v*, 52*w* . . . upper arm
54*u*, 54*v*, 54*w* . . . lower arm
Tov . . . energization overlap period

The invention claimed is:

1. An electric power system comprising: an electric motor; an electric power source; an inverter including upper arms and lower arms of a U phase, a V phase and a W phase; a control device configured to control the inverter to thereby control power supply from the electric power source to the electric motor; a capacitor connected in parallel to the inverter at a direct current end side of the inverter; and an abnormality detecting device configured to detect an abnormality for which the electric motor needs to be stopped or an output of the electric motor needs to be reduced, wherein when the abnormality detecting device detects the abnormality, the control device performs switching control to alternately switch between upper arm three-phase short-circuiting control and lower arm three-phase short-circuiting control; in the upper arm three-phase short-circuiting control, all the upper arms are placed in an energization state while all the lower arms are placed in a non-energization state; and in the lower arm three-phase short-circuiting control, all the upper arms are placed in a non-energization state while all the lower arms are placed in an energization state; and the control device is configured to, when switching between the upper arm three-phase short-circuiting control and the lower arm three-phase short-circuiting control, generate an energization overlap period in which a state where electric current flows through the upper arms and a state where electric current flows through the lower arms are simultaneously generated, wherein the all the upper arms are placed in the energization state by activating an upper arm drive signal, all the lower arms are placed in the energization state by activating a lower arm drive signal, when alternately switching between the upper arm three-phase short-circuiting control and the lower arm three-phase short-circuiting control, the control device inserts a dead time between the upper arm three-phase short-circuiting control and the lower arm three-phase short-circuiting control, during the dead time, the upper arm drive signal and the lower arm drive signal are not activated, and wherein the control device adjusts the energization overlap period by adjusting the dead time such that the energization overlap period becomes longer as the dead time becomes shorter, wherein the control device causes the energization overlap period after start of the switching control to be longer than the energization overlap period at start of the switching control.

2. The electric power system according to claim 1, wherein:
- the electric power system is applied to an electrical vehicle including the electric motor as a drive source; and
- the abnormality detecting device is a collision detecting device configured to detect collision of the electrical vehicle.

* * * * *